US007916918B2

(12) United States Patent
Suri et al.

(10) Patent No.: US 7,916,918 B2
(45) Date of Patent: Mar. 29, 2011

(54) DIAGNOSTIC SYSTEM FOR MULTIMODALITY MAMMOGRAPHY

(75) Inventors: Jasjit S. Suri, Westminster, CO (US); Roman Janer, Englewood, CO (US); Yujun Guo, Kent, OH (US); Idris A. Elbakri, Northglenn, CO (US)

(73) Assignee: Hologic, Inc., Bedford, MA (US)

( * ) Notice: Subject to any disclaimer, the term of this patent is extended or adjusted under 35 U.S.C. 154(b) by 444 days.

(21) Appl. No.: 11/632,082

(22) PCT Filed: Jul. 7, 2005

(86) PCT No.: PCT/US2005/024257
§ 371 (c)(1),
(2), (4) Date: Jul. 13, 2009

(87) PCT Pub. No.: WO2006/017172
PCT Pub. Date: Feb. 16, 2006

(65) Prior Publication Data
US 2009/0297006 A1 Dec. 3, 2009

Related U.S. Application Data

(60) Provisional application No. 60/586,669, filed on Jul. 9, 2004.

(51) Int. Cl.
G06K 9/00 (2006.01)
A61B 6/00 (2006.01)
A61B 5/05 (2006.01)
(52) U.S. Cl. .............................. 382/131; 378/4; 600/407
(58) Field of Classification Search .......... 382/128–134, 382/173, 274, 284, 294, 312; 600/407, 476; 378/4, 20, 21
See application file for complete search history.

(56) References Cited

U.S. PATENT DOCUMENTS

| 5,297,551 | A | 3/1994 | Margosian et al. |
| 6,324,243 | B1 | 11/2001 | Edic et al. |
| 6,421,454 | B1 | 7/2002 | Burke et al. |
| 6,856,310 | B2 * | 2/2005 | Ditt et al. ...................... 345/156 |
| 6,878,115 | B2 * | 4/2005 | Dione et al. .................. 600/459 |

OTHER PUBLICATIONS

International Preliminary Report on Patentablity in connection with PCT/US2005/024257.

* cited by examiner

*Primary Examiner* — Kanji Patel
(74) *Attorney, Agent, or Firm* — Lindsay G. McGuinness

(57) ABSTRACT

A method includes acquiring first imaging information of a region of interest, said first imaging information providing data correlated to three spatial dimensions of a reference frame including said region of interest; acquiring second projection imaging information of said region of interest, said second imaging information providing data correlated to said reference frame but is lacking information concerning at least one spatial dimension; and processing said first and second imaging information such that said first imaging information is registered with said second imaging information. An apparatus includes a first imaging system for acquiring imaging information of a region of interest, said first imaging information providing data correlated to three spatial dimensions of a reference frame including said region of interest; a second imaging system for acquiring second imaging information of said region of interest, said second imaging information providing data correlated to said reference frame but is lacking information concerning at least one spatial dimension; and a processor for processing said first and second imaging information such that said first imaging information is registered with said second imaging information.

20 Claims, 20 Drawing Sheets

DIAGNOSTIC SYSTEM FOR MULTIMODALITY MAMMOGRAPHY

CROSS-REFERENCE TO RELATED APPLICATIONS

This application claims the benefit of U.S. Provisional Application No. 60/586,669, filed Jul. 9, 2004.

FIELD

Embodiments of the present invention relate generally to diagnostic systems for multimodality mammography, and more specifically to imaging in 3 dimensions using a first modality and imaging in fewer than 3 dimensions using a second modality.

BACKGROUND

In the field of medical imaging, various modalities are available, such as magnetic resonance imaging (MRI) and computed tomography (CT). Fusion (i.e., combined use) of multiple imaging modalities has been employed for the past decade and is still in its infancy stage. Fusion of MR and CT was first, due in part to the digital nature of these modalities. Because conventional approaches toward fusion of MR and CT typically use the entire breast volume for processing, the associated combined algorithms are computationally intensive. As such, conventional fusion approaches are often not practical in image guided surgery and real-time breast imaging applications.

FIG. 1 and FIG. 2 show one example of a conventional approach of combined medical imaging modalities as disclosed by General Electric Company. The system generates 3-D X-ray volumetric slices using the 3-D tomosynthesis principle (Wu et al.). A second stage involves 3-D ultrasound (US) scanning using a US transducer, which is used to scan on the top of a plastic sheet. The output includes multiple 3-D ultrasound slices.

SUMMARY

A method for use in medical imaging includes acquiring first volumetric imaging information of a region of interest, said first imaging information providing data that is correlated to three spatial dimensions of a reference frame including said region of interest; acquiring second projection imaging information of said region of interest, said second imaging information providing data that is correlated to said reference frame but is lacking information concerning at least one of said spatial dimensions; and processing said first imaging information and said second imaging information such that said first imaging information is registered with said second imaging information with respect to said three spatial dimensions of said reference frame.

An apparatus for use in medical imaging includes a first imaging system for acquiring volumetric imaging information of a region of interest, said first imaging information providing data that is correlated to three spatial dimensions of a reference frame including said region of interest a second projection imaging system for acquiring second projection imaging information of said region of interest, said second imaging information providing data that is correlated to said reference frame but is lacking information concerning at least one of said spatial dimension; and a processor for processing said first imaging information and said second imaging information such that said first imaging information is registered with said second imaging information with respect to said three spatial dimensions of said reference frame.

DETAILED DESCRIPTION

Figure 1:
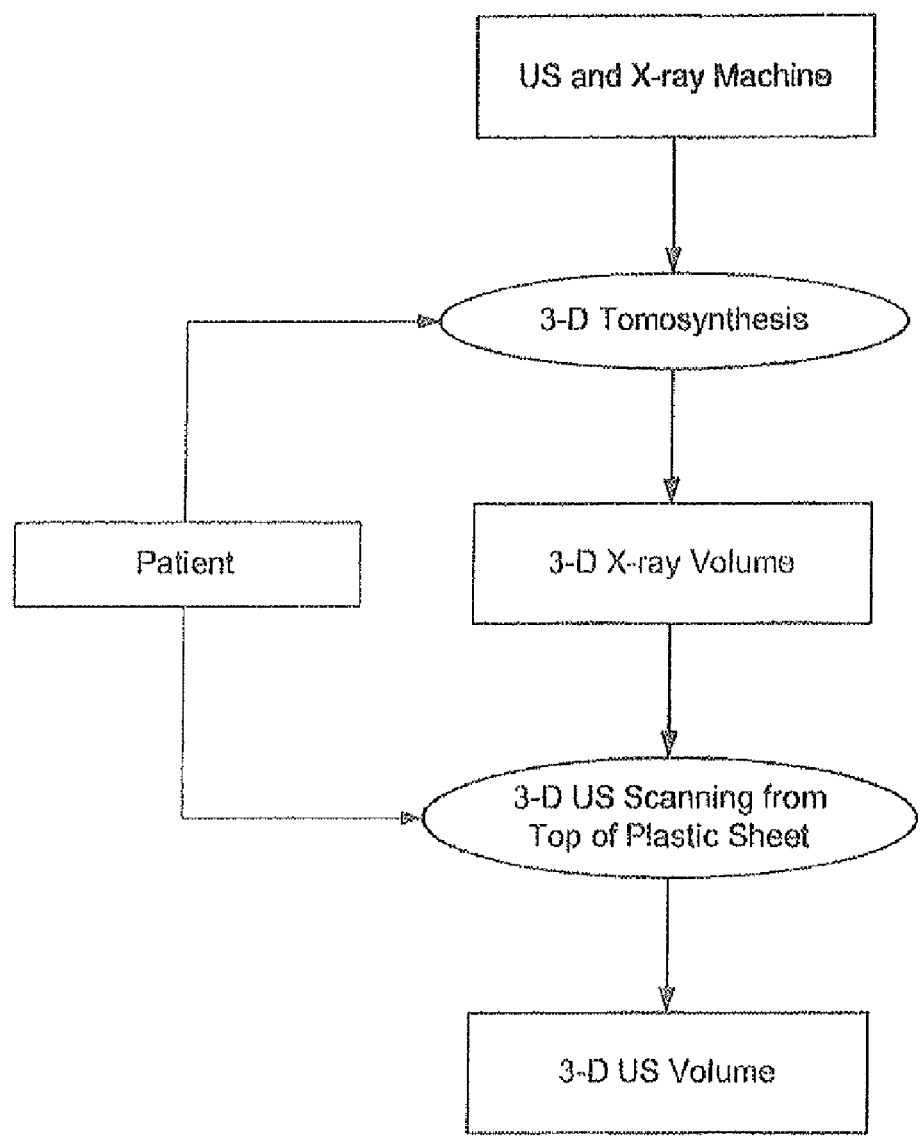
FIGS. 1 and 2 illustrate conventional imaging systems that combine imaging modalities.
Figure 2:
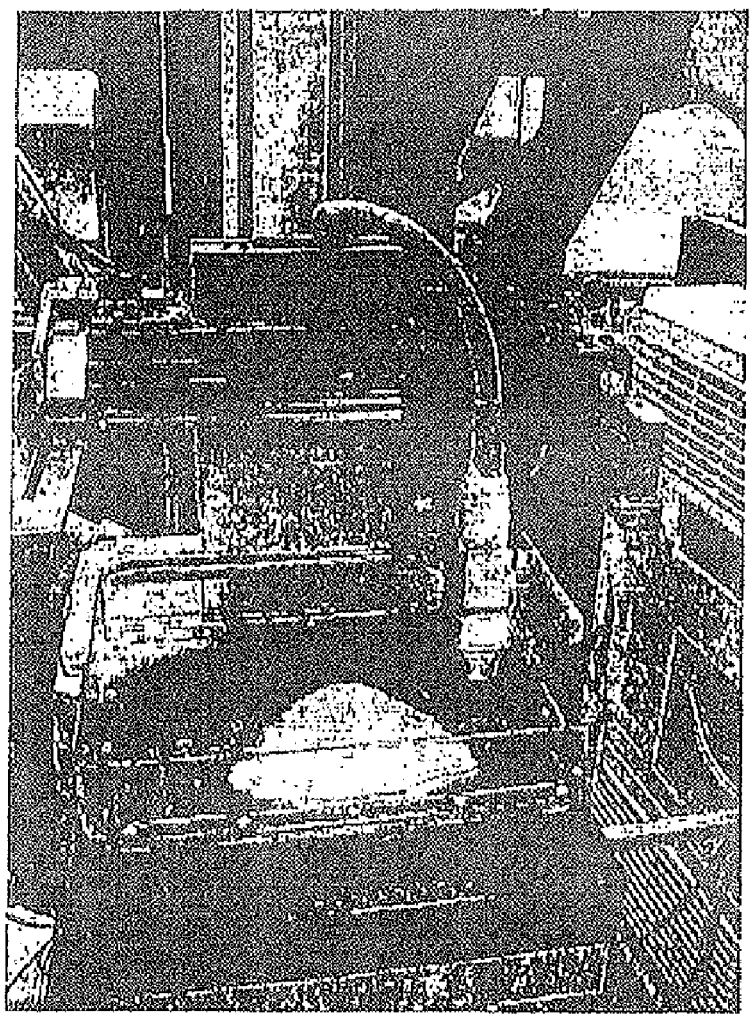

Embodiments of a system are provided to accurately detect lesions in breast volumes. In accordance with various embodiments, an ultrasound (US) volume is fused with X-ray projection images. Such fusion can be done in a system in which X-ray scanning is first performed using a fused or multi-modal system followed by ultrasound scanning. The X-ray scanning yields a projection image while the ultrasound scanning yields 3-D ultrasound slices.

In accordance with a particular embodiment, the system first computes the US projection image, given the 3-D ultrasound volume. This projection technique can employ a neighborhood approach for computing the 2-D ultrasound image projection. The US projection image is then segmented based on a surface fitting approach. The X-ray image is enhanced using a combination of gray scale mathematical morphology and signal processing characteristics of the system. The X-ray image is then segmented to obtain lesions. The segmentation system is implemented by compartmentalization of the fuzzy pixels in a corresponding compartment. The two-segmented images are then registered for diagnostic purposes. The foregoing functions can be implemented in a multi-resolution framework.

Embodiments of the present invention provide for diagnostic information extraction. Embodiments of systems include mammography screening and diagnostic systems. In accordance with these embodiments, the patient's breast can be screened by fusing ultrasound with X-rays systems. As such, these embodiments fuse imaging modalities for diagnostic information extraction.

Some embodiments provide for multi-modality image acquisition. In accordance with these embodiments, the diagnostic system combines multi-modality systems, wherein one modality extracts image data in 3 dimensions and a second modality extracts image data in 2 dimensions.

Some embodiments provide for extraction of 3-D Volumes. In accordance with these embodiments, the diagnostic system can collect breast tissue properties in 3-D and tissue attenuation properties in 2-D. Beneficially, 3-D ultrasound can be used to provide complete spatial relationship of existing breast lesions. The system can take advantage of the spatial relationship by projecting the 2-D images from 3-D ultrasound volume.

Some embodiments include a diagnostic system carrying out a two-stage process. The first stage involves extraction of lesions using an ultrasound projection imaging technique. The lesion extraction stage in X-ray images is also performed using the properties of X-ray attenuation. The second stage involves registering the volumes generated from the first stage.

In accordance with various embodiments, volume registration is based on a similarity measure when one image is computed using the 3-D volume projection while the other image is a planar projection. As such, the registration stage uses images from different frameworks, making the registration stage robust. The method can use a mutual-information-based strategy. In some embodiments, the registration is done in the multi-resolution framework. As such, convergence can be performed in a fast and accurate manner.

In some embodiments, lesion extraction is performed in a first modality, such as ultrasound, within a multi-modality framework. In accordance with these embodiments, the process uses tissue properties of reflection for segmenting the lesions and computes a topology of the surface characteristics using noise characteristics from the images.

In accordance with some embodiments, noise is computed by finding the error between the observed surface and a fitted surface. The fitting is performed in a neighborhood window. A Quadratic Surface is assumed with a second order surface, which can improve the noise characteristics. The fitting is done by computing the coefficients an in iterative methodology. The estimated surface is then computed using the fitted coefficients. The noise is then computed by computing the error between the fitted surface and the observed surface in a given window.

Some embodiments include a lesion extraction process using a second modality. In these embodiments, X-ray projections are generated and system attenuation properties are used to extract lesions. Noise in the X-ray system is removed using the 3-D topology of the noise characteristics in the system. This lesion extraction process can be implemented in a gray scale mathematical morphology framework.

Various embodiments provide for enhancement of modalities. For example, enhancement of the X-rays can be done based on the miss-hit transform of grayscale mathematical morphology.

Some embodiments enable compartmentalization of data obtained using a modality. The lesion extraction process in a second modality (e.g., X-ray projection) can be performed by putting pixels associated with lesions in a lesion compartment and putting pixels associated with non-lesions in a non-lesion compartment. The system has an ability to correctly place the pixels near or on the boundary in the correct compartment.

In some embodiments, the diagnostic system provides data preparation. In these embodiments, the diagnostic system of stage-II includes computing first the binary images from the above segmentation systems at stage-I. These binary images are then searched for lesion regions. The searched regions are then combined for diagnostic purposes based on the closest measure of similarity.

Systems and methods described herein can be generalized to numerous modalities. In accordance with some embodiments, a software-based fusion diagnostic system acquires image data in 3-D using one modality and another modality acquires a 2-D projection. The fusion system can be easily extended to any 3-D methodology, such as, but not limited to, MRI or CT.

Some embodiments provide for diagnostic fusion of modalities. The registration can be based on a similarity measure when one image is computed using the 3-D volume projection while the other image is computed using planar projection. Because the registration process can use images coming from different frameworks, registration is very robust. In accordance with various embodiments, the method uses a mutual-information-based strategy.

Some embodiments include diagnostic systems providing for multi-resolution using fused mammography. The volume registration can be done in the multi-resolution framework to facilitate fast and accurate convergence.

In accordance with some embodiments, fusion of 3-D volumes with 2-D projection images can be employed in breast imaging. Some techniques combine X-ray projection images and 3-D ultrasound (US) images. These techniques can employ handheld ultrasound and an X-ray machine. To facilitate the diagnostic ability of such breast imaging techniques, an ultrasound projection image is first computed from a 3-D ultrasound acquired using a customized US transducer. The US projection image can be computed using the fan beam projection algorithm as used in the 3-D computed tomography (CT) imaging. The X-ray projection image is acquired using a scanning machine, such as the SenoScan® machine from Fischer Imaging Corporation.

Figure 3:
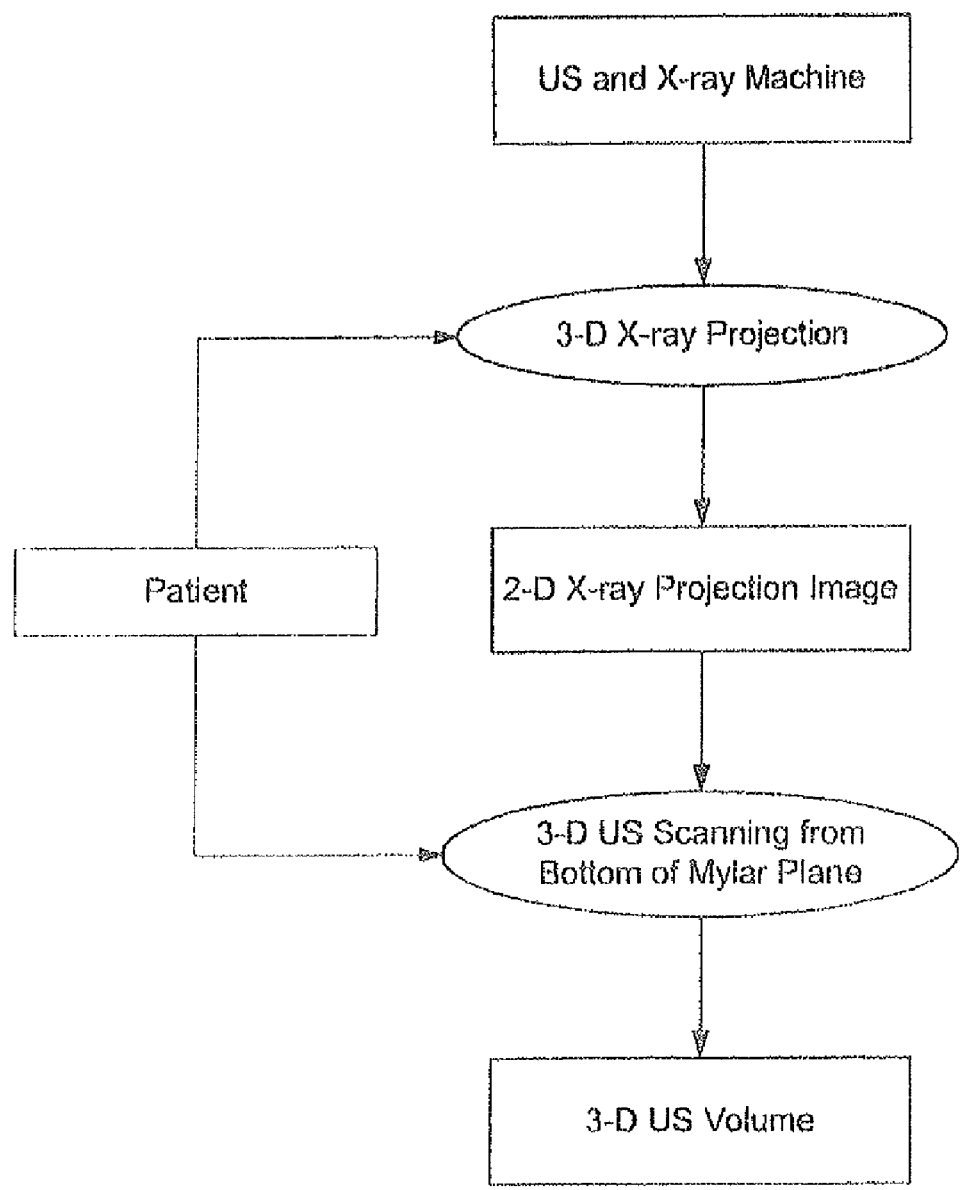
FIG. 3 illustrates one exemplary process for breast imaging with combined US and X-ray imaging, in accordance with an embodiment of the present invention.
Figure 4:
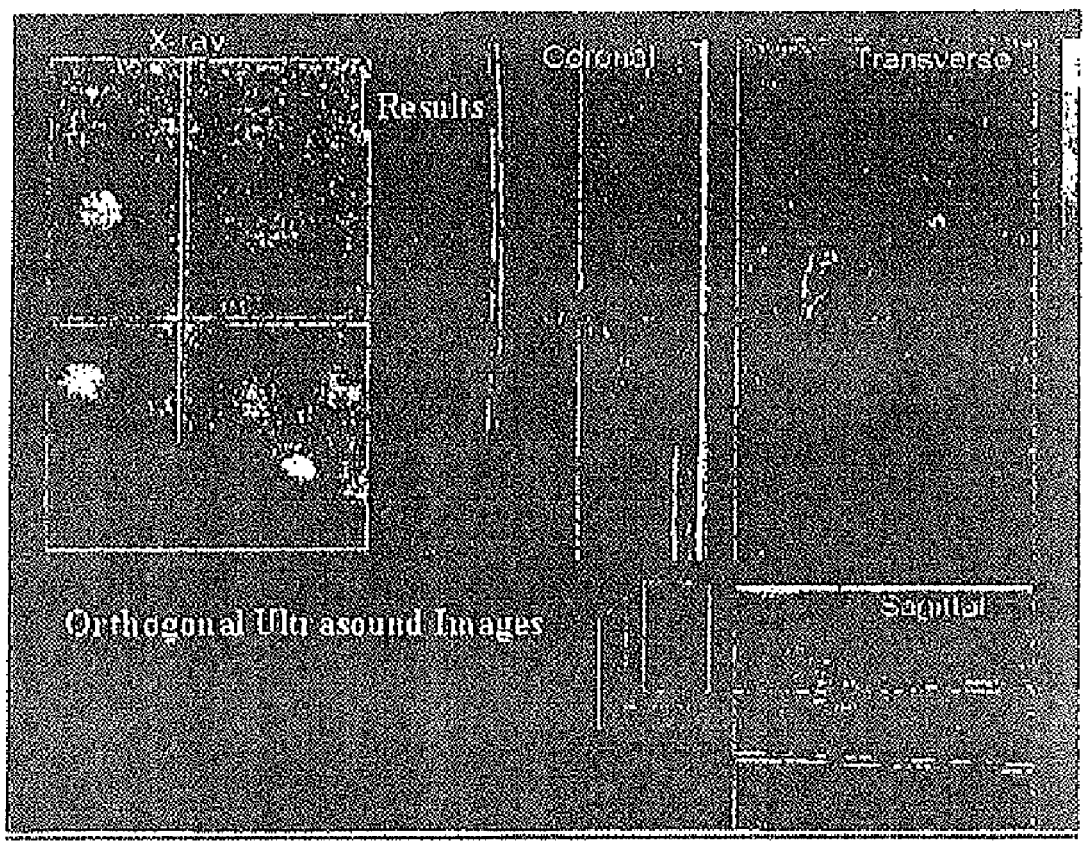
FIG. 4 illustrates exemplary images output from the US transducer stage in accordance with one embodiment.

FIG. 3 illustrates one exemplary process for breast imaging with combined US and X-ray imaging. The process includes two stages. The first stage employs an X-ray scanning system, which uses 2-D X-ray projection images (as shown in the ellipse in FIG. 3). The second stage involves 3-D ultrasound scanning, wherein the ultrasound scanning is done using the ultrasound transducer by moving the transducer beneath the Mylar sheet. The output includes slices in three orthogonal directions: Sagittal, Coronal and Transverse. Exemplary images output from the US transducer stage are shown in FIG. 4.

Figure 5:
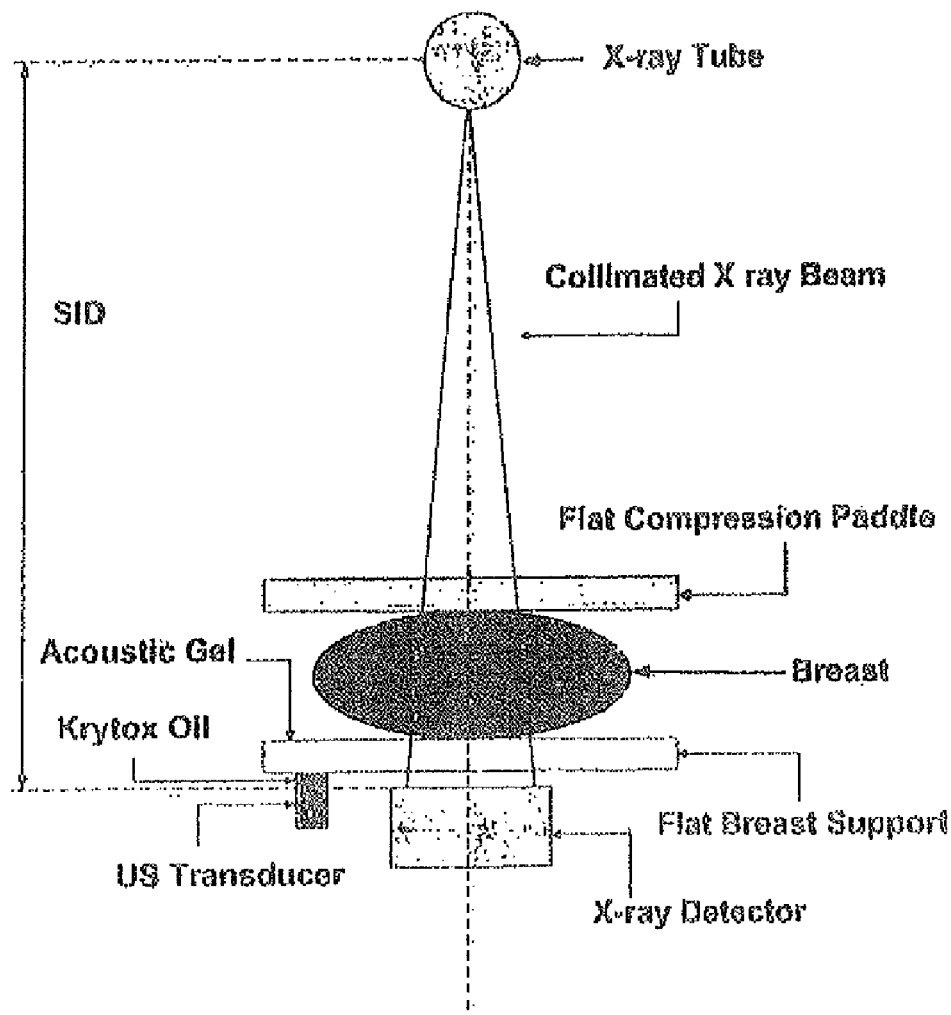
FIG. 5 illustrates an exemplary system in which image data acquisition can be performed in accordance with one embodiment.

FIG. 5 shows an exemplary system in which image data acquisition can be performed in accordance with one embodiment. This particular embodiment includes an exemplary relationship between the fused medical modality systems. The breast to be scanned is positioned between the flat breast support and the breast paddle. The X-ray beams penetrate the patient's breast and the attenuation properties are captured at the digital detector. The image can be reconstructed using the digital detector principle. In the same system, the 3-D ultrasound breast slices are reconstructed.

Figure 6:
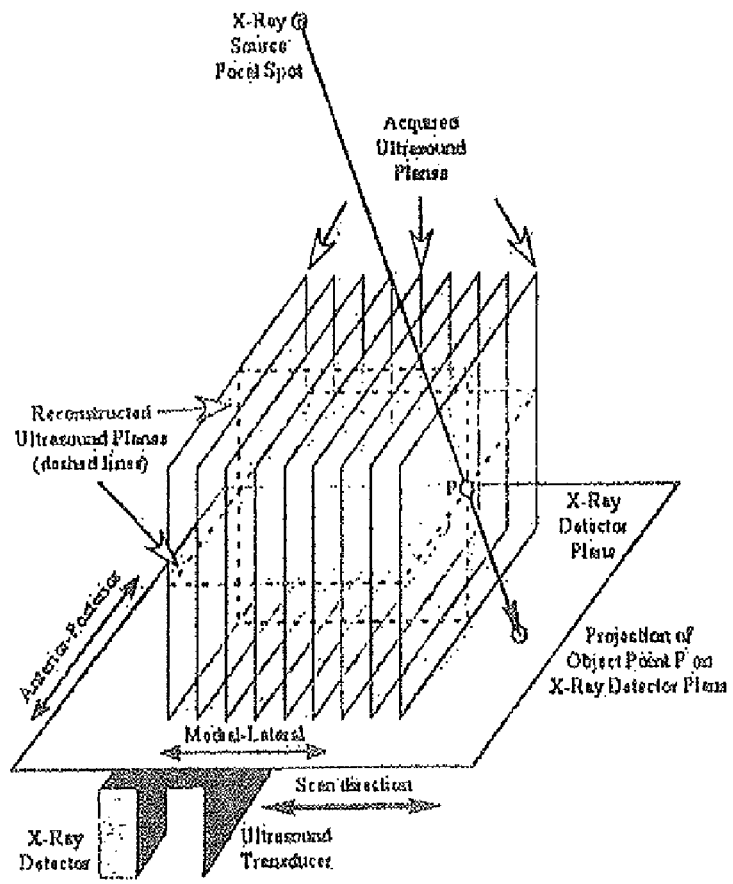
FIG. 6 illustrates exemplary 2-D projection image generation given the 3-D ultrasound slices of the breast volume.

FIG. 6 illustrates exemplary 2-D projection image generation given the 3-D ultrasound slices of the breast volume. The ultrasound transducer moves in the scanning direction generating the ultrasound slices of the breast volume. Also shown is the X-ray detector plane below the 3-D ultrasound slices.

Figure 7:
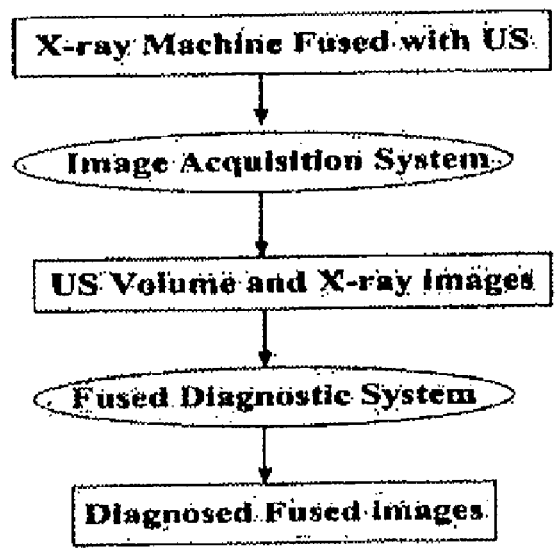
FIG. 7 shows an exemplary embodiment of a system for scanning for breast lesions.

FIG. 7 shows an exemplary embodiment of a system for scanning for breast lesions. The system consists of two stages: Multi-modality data acquisition system and diagnostic system. The data acquisition system helps in acquiring the 2-D projection X-ray images and 3-D slices of the breast using the 3-D scanning procedure. The second stage is the diagnostic system where the two modalities are fused based on images acquired during the scanning procedure.

Figure 8:
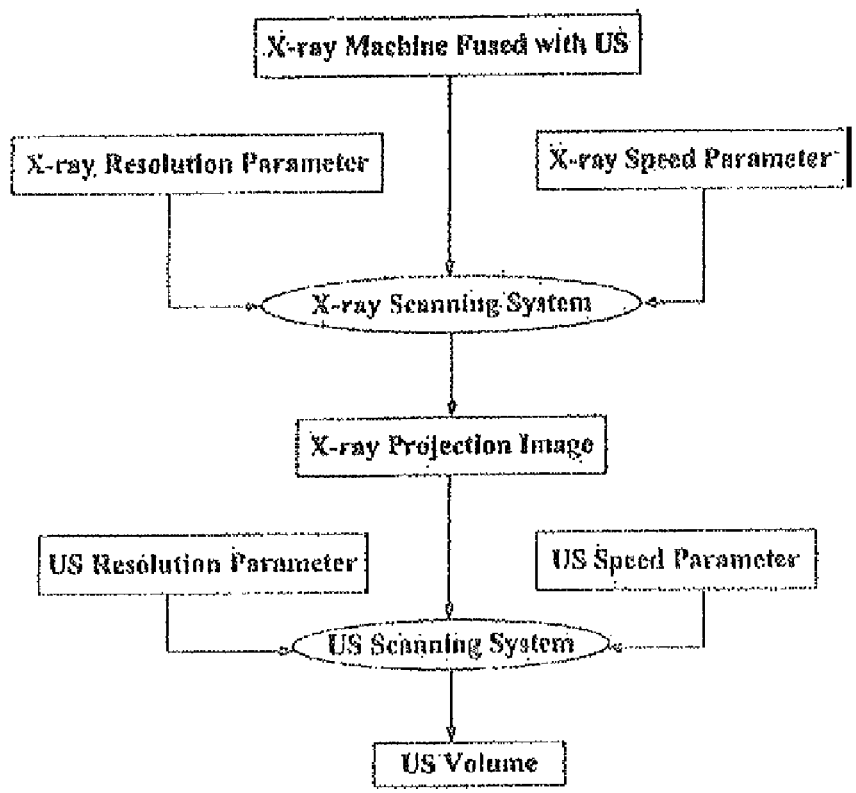
FIG. 8 shows exemplary functional details of the image acquisition procedure in accordance with one embodiment.

FIG. 8 shows exemplary functional details of the image acquisition procedure in accordance with one embodiment. The procedure includes two primary stages: X-ray scanning and US scanning. The X-ray scanning system accepts as input X-ray parameters, such as X-ray resolution parameters and X-ray speed parameters. The second stage includes ultrasound scanning, in which the 3-D ultrasound slices of the breast are acquired. Note that in embodiments of the acquisition system, while both scanning stages could be performed simultaneously, this is not required. As such, the X-ray scanning and US scanning can be performed in parallel or in series. However, in some embodiments the electrical and mechanical components of the X-ray scanning system and the US scanning system may be coupled in an integrated breast scanning system, classified as a mammography system.

Figure 9:
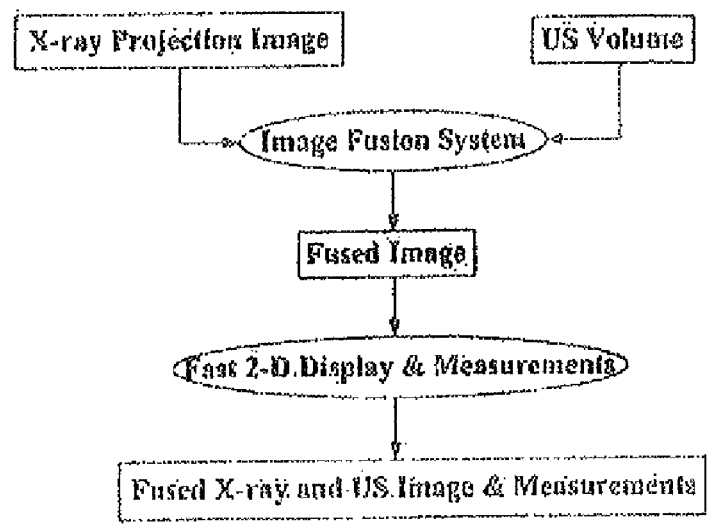
FIG. 9 shows an exemplary embodiment of a fused diagnostic system.

FIG. 9 shows an exemplary embodiment of a fused diagnostic system. The input includes the X-ray image and ultrasound volume from image acquisition system (FIG. 8). X-ray image and US volume are fused in image fusion system, and the fused image is then forwarded to a fast 2-D display and measurements system, in which fused X-ray and ultrasound image and measurements are generated.

Figure 10:
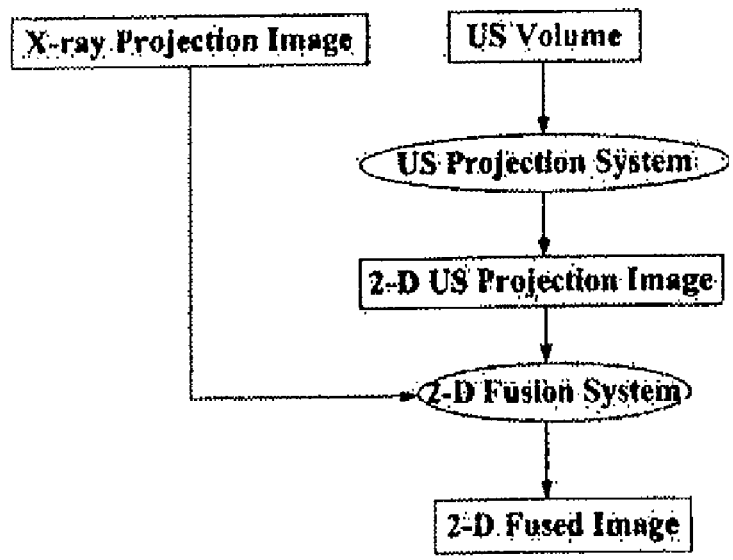
FIG. 10 shows an exemplary embodiment of an image fusion system.

FIG. 10 shows an exemplary embodiment of an image fusion system. US volume first goes through US projection system, where it is projected into a 2-D US image. Then the 2-D US projection image is fused with an X-ray image by a 2-D fusion system, and a 2-D fused image is produced.

Figure 11:
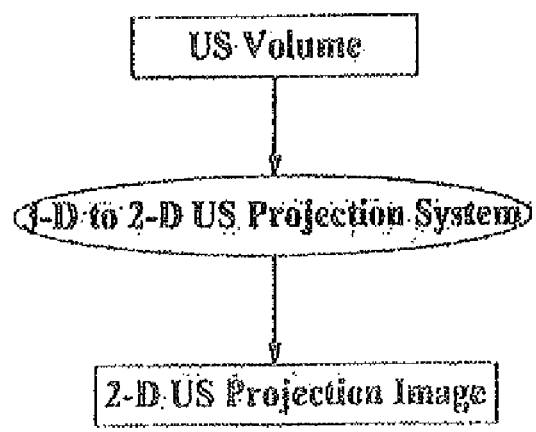
FIG. 11 shows an exemplary embodiment of an ultrasound (US) projection system.

FIG. 11 shows an exemplary embodiment of an ultrasound (US) projection system. In this embodiment, a 3-D US volume is projected into a 2-D US projection image, through a 3-D to 2-D projection system.

Figure 12:
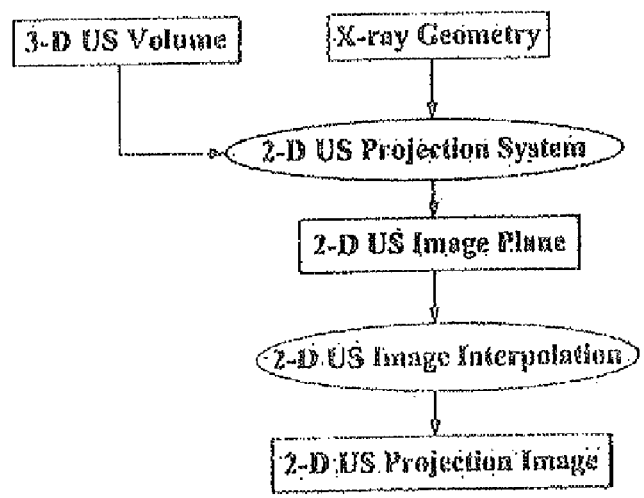
FIG. 12 shows exemplary functional details of the 3-D to 2-D projection system.

FIG. 12 shows exemplary functional details of the 3-D to 2-D projection system. Given X-ray geometry which will cut through the 3-D US volume, 2-D projection system create 2-D US projection image on the 2-D US image plane. 2-D US projection image is created after 2-D image interpolation.

Figure 13:
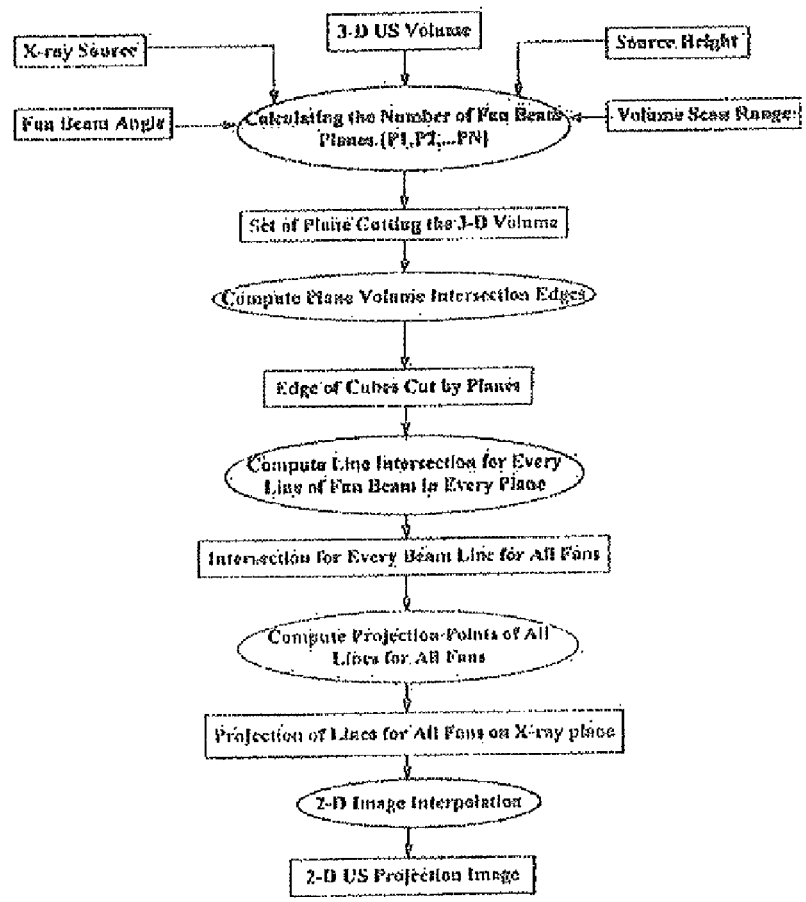
FIG. 13 shows an exemplary embodiment of a 2-D projection system.

FIG. 13 shows an exemplary embodiment of a 2-D projection system. The X-ray geometry includes X-ray source position, source height, volume scan range, and the angle between fan beams. With these parameters and the 3-D US volume, a series of fan beam planes are calculated. The calculated planes will cut through the breast volume. The intersection points of all the fan beam lines in the planes and the volume are computed. Then the projection point for each line can be calculated, and all the projections form the projection image. After image interpolation, 2-D US projection image is the output.

Figure 14:
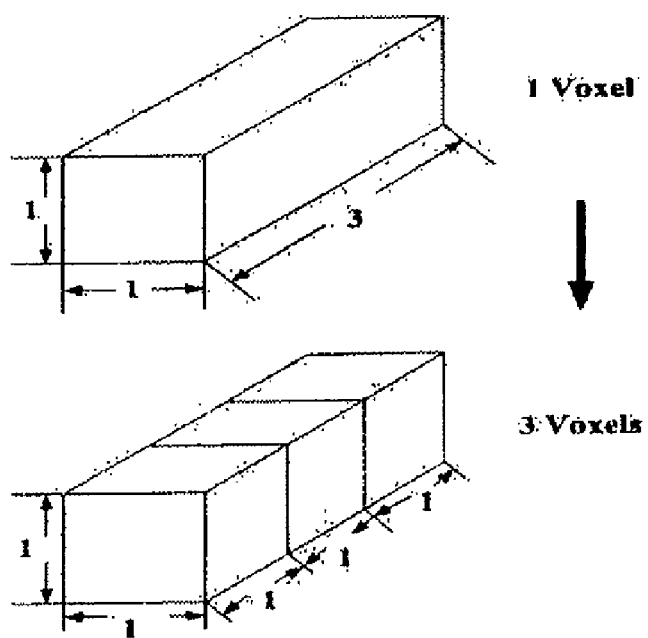
FIG. 14 is an illustrative view of 3-D US interpolation in accordance with one embodiment.

FIG. 14 is an illustrative view of 3-D US interpolation in accordance with one embodiment. US volume voxel is not necessarily a cube. Interpolation can be used to determine a voxel value associated with each cube.

Figure 15:
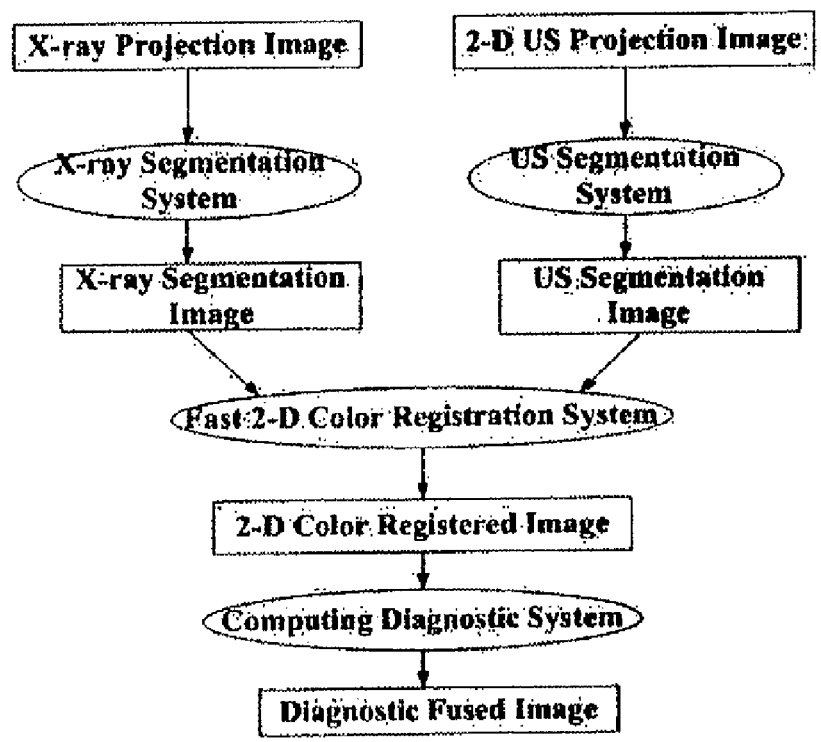
FIG. 15 shows an exemplary 2-D fusion system in accordance with one embodiment.

FIG. 15 shows an exemplary 2-D fusion system in accordance with one embodiment. X-ray image and 2-D US projection image (as shown in FIG. 13) go through X-ray segmentation system and US segmentation system respectively, and the resulting segmentation images are the input of fast 2-D color registration system. The 2-D color registered image from registration system is then transformed into diagnostic fused image through computing diagnostic system.

Figure 16:
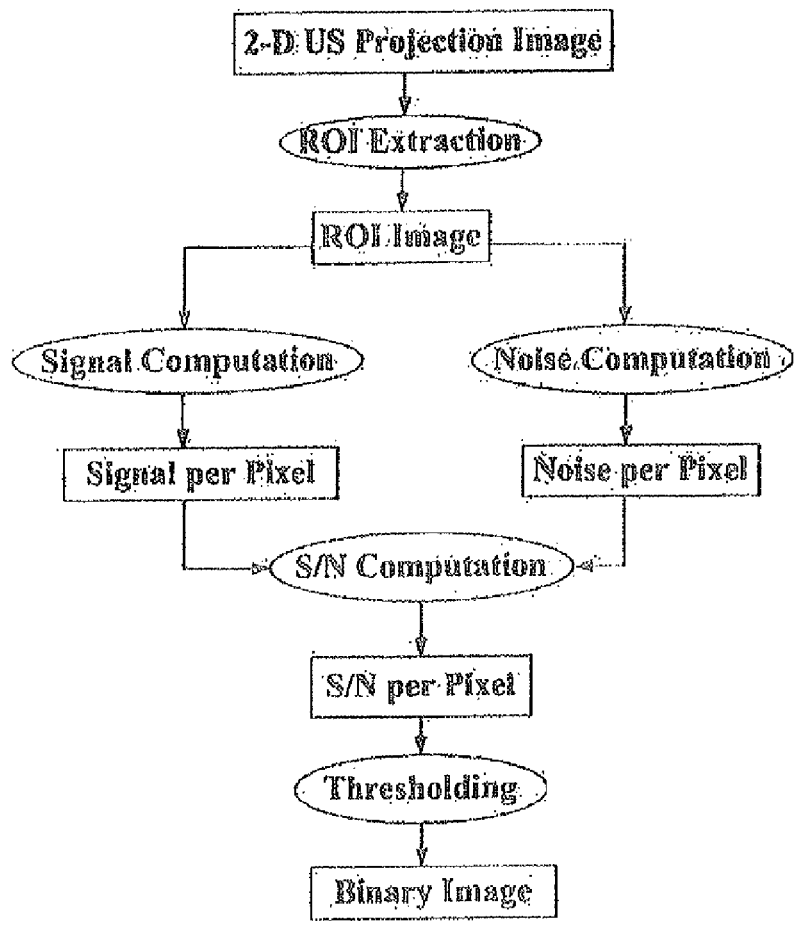
FIG. 16 illustrates an embodiment of a US segmentation system.

FIG. 16 illustrates an embodiment of a US segmentation system. An ROI (region of interest) is first extracted from the 2-D US projection image. Then different regions will each go through a different computation, noise or signal computation, for each pixel in the region. Signal-to-noise ratio (SNR) can be computed at each pixel position. After thresholding the SNR image, the segmented binary image is created.

Figure 17:
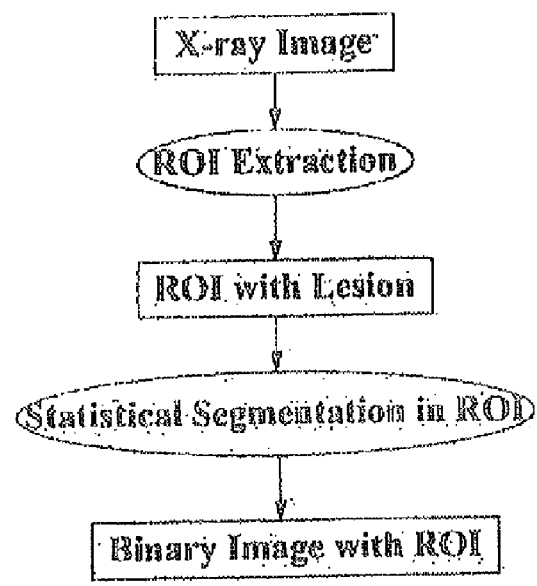
FIG. 17 shows an X-ray segmentation system in accordance with a particular embodiment.

FIG. 17 shows an X-ray segmentation system in accordance with a particular embodiment. ROI is also extracted in X-ray image. The statistical segmentation method is applied to the extracted ROI with lesion, and the segmented binary image is generated.

Figure 18:
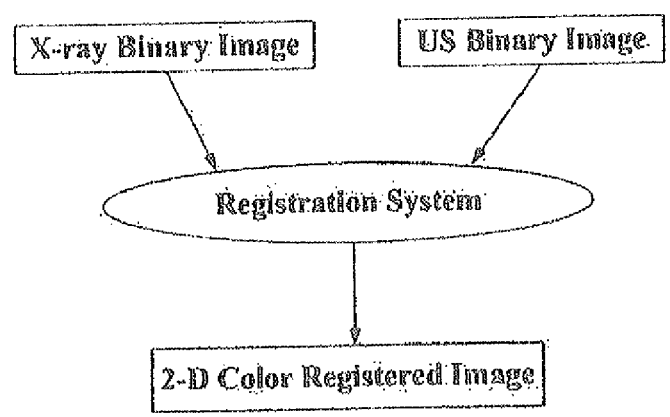
FIG. 18 illustrates an exemplary embodiment of a fast 2-D color registration system.

FIG. 18 illustrates an exemplary embodiment of a fast 2-D color registration system. The segmented X-ray binary image and US binary image are registered by a mutual information based registration system, and a 2-D color registered image is produced.

Figure 19:
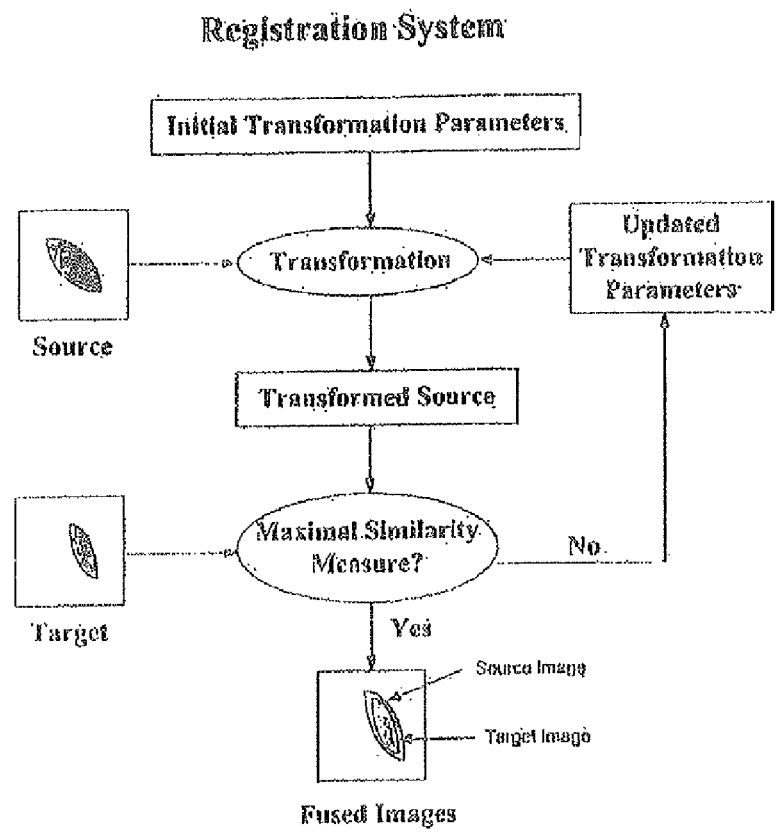
FIG. 19 illustrates a registration system in accordance with one embodiment.

FIG. 19 illustrates a registration system in accordance with one embodiment. Given two input images, one is taken as a reference image, the other as a floating image. The goal is to find the optimal transformation, which will maximize the similarity measure between the transformed floating image and the reference image. After the iteration, the transformation parameters are obtained. Those parameters are applied to the floating image, and overlaid onto the reference image, using different colors. The color-registered image is generated.

Figure 20:
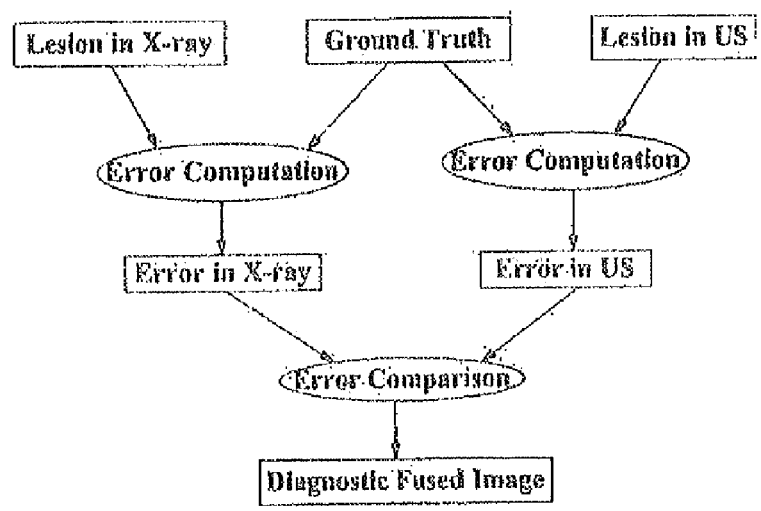
FIG. 20 shows an exemplary computing diagnostic system.

FIG. 20 shows an exemplary computing diagnostic system. The lesions computed from the X-ray image and the US image are compared to the ground truth lesion image, and then the errors between are computed respectively. The error comparison result is applied to the fused image, and a fused diagnostic image is obtained.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for use in medical imaging, comprising the steps of:
    acquiring first volumetric imaging information of a region of interest, said first imaging information providing data that is correlated to three spatial dimensions of a reference frame including said region of interest;
    acquiring second projection imaging information of said region of interest, said second imaging information providing data that is correlated to said reference frame but is lacking information concerning at least one of said spatial dimensions; and
    processing said first imaging information and said second imaging information such that said first imaging information is registered with said second imaging information with respect to said three spatial dimensions of said reference frame.

2. A method as set forth in claim 1, wherein said first imaging information is generated using a first imaging modality and said second imaging information is generated using a second imaging modality different than said first imaging modality.

3. A method as set forth in claim 2, wherein said first imaging modality is one of ultrasound (US), magnetic resonance imaging (MRI) or computed tomography (CT).

4. A method as set forth in claim 2, wherein said second imaging modality is a projection technology involving transmission of a signal relative to region of interest and detecting the signal at a detection surface so as to obtain said projection imaging information.

5. A method as set forth in claim 4, wherein said first imaging modality is ultrasound (US) and said second imaging information is lacking information regarding a location of a feature of said location of interest relative to a transmission axis of said signal.

6. A method as set forth in claim 2, wherein said second imaging modality is X-ray.

7. A method as set forth in claim 6, wherein said region of interest is within a patient's breast.

8. A method as set forth in claim 1, wherein said first imaging information and said second imaging information are obtained by a multi-modal system the first imaging information and the second imaging information have a positional relationship that is known with respect to at least one of said three-dimensions.

9. A method as set forth in claim 1, wherein said step of processing comprises deriving two-dimensional projection image information from said first imaging information.

10. A method as set forth in claim 9 wherein said volumetric imaging information comprises composite information aggregated from images of a series of columns, and said deriving comprises:
   establishing a number of projection axes associated with said second projection image information;
   for each said projection axis, identifying points of intersection of said axis with peripheries of said volumes; and
   using said points of intersection to define said derived two-dimensional projection image information.

11. A method as set forth in claim 9, wherein said step of processing further comprises segmenting said derived two-dimensional image information by using a threshold value to distinguish first portions of said two-dimensional image information having potential diagnostic value from second portions characterized as reflecting noise.

12. A method as set forth in claim 1, wherein said step of processing comprises enhancing said second imaging information by using a three-dimensional topology of noise characteristics associated with the second projection information to remove noise therefrom.

13. A method as set forth in claim 1, wherein said step of processing comprises segmenting said second imaging information to image a location within said region of interest.

14. A method as set forth in claim 13, wherein said step of segmenting comprises obtaining said second imaging information in relation to a number of pixels, establishing spatial compartments correlated to said pixels, and compartmentalizing said second imaging information relative to said spatial compartments.

15. A method as set forth in claim 14, wherein said spatial compartments comprise first compartments of a first size and second compartments of a second size where said first compartments and said second compartments correspond to a same spatial region, thereby allowing for different imaging resolutions.

16. A method as set forth in claim 2, generating a composite image showing first processed information corresponding to said first modality and second processed information corresponding to said second modality.

17. A method as set forth in claim 16, wherein said first processed information and said second processed information are rendered in said composite image so as to allow for visual discrimination therebetween.

18. A method as set forth in claim 1, wherein said second imaging information is segmented to identify features of interest, and said processing further involves spatially registering said first segmented imaging information and said second segmented imaging information.

19. A method for use in medical imaging comprising the steps of:
   compiling volumetric imaging information of the region of interest, wherein said volumetric imaging information comprises composite information aggregated from images of a series of volumes; and
   deriving two-dimensional projection image information from said volumetric imaging information by establishing a number of projection axes for said projection image information;
   for each said projection axis, identifying points of intersection of said axis with peripheries of said volumes; and
   using said points of intersection to define said derived projection image information.

20. An apparatus for use in medical imaging, comprising:
   a first imaging system for acquiring first volumetric imaging information of a region of interest, said first imaging information providing data that is correlated to three spatial dimensions of a reference frame including said region of interest;
   a second projection imaging system for acquiring second projection imaging information of said region of interest, said second imaging information providing data that is correlated to said reference frame but is lacking information concerning at least one of said spatial dimensions; and
   a processor for processing said first imaging information and said second imaging information such that said first imaging information is registered with said second imaging information with respect to said three spatial dimensions of said reference frame.

* * * * *